US012671871B2

(12) United States Patent  
Gupta et al.

(10) Patent No.: US 12,671,871 B2  
(45) Date of Patent: *Jun. 30, 2026

(54) SYSTEMS AND METHODS FOR PROVIDING TIMELINE OF CONTENT ITEMS ON A USER INTERFACE

(71) Applicant: Adeia Guides Inc., San Jose, CA (US)

(72) Inventors: Vikram Makam Gupta, Bangalore (IN); Vishwas Sharadanagar Panchaksharaiah, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/932,404

(22) Filed: Oct. 30, 2024

(65) Prior Publication Data

US 2025/0126328 A1     Apr. 17, 2025

Related U.S. Application Data

(63) Continuation of application No. 17/372,860, filed on Jul. 12, 2021, now Pat. No. 12,167,093, which is a continuation of application No. 16/720,286, filed on Dec. 19, 2019, now Pat. No. 11,095,949.

(51) Int. Cl.

| | |
|---|---|
| *H04N 21/472* | (2011.01) |
| *H04N 21/44* | (2011.01) |
| *H04N 21/488* | (2011.01) |
| *H04N 21/845* | (2011.01) |

(52) U.S. Cl.
CPC ... *H04N 21/47217* (2013.01); *H04N 21/4882* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 7,761,892 B2 | 7/2010 | Ellis et al. | |
| 8,046,801 B2 | 10/2011 | Ellis et al. | |
| 8,737,820 B2 | 5/2014 | Hilem | |
| 8,942,542 B1 | 1/2015 | Sherrets et al. | |
| 9,237,297 B1 | 1/2016 | Waddell et al. | |
| 9,792,026 B2 * | 10/2017 | Bloch | G06F 3/04842 |
| 10,555,023 B1 | 2/2020 | Mccarthy et al. | |
| 2005/0251827 A1 | 11/2005 | Ellis et al. | |
| 2008/0063363 A1 | 3/2008 | Kientz et al. | |
| 2010/0303440 A1 | 12/2010 | Lin et al. | |
| 2011/0010624 A1 | 1/2011 | Vanslette et al. | |

(Continued)

*Primary Examiner* — Hung Q Dang  
(74) *Attorney, Agent, or Firm* — HG LAW LLP

(57) ABSTRACT

The methods and systems described herein provide timelines of content segments on a user interface. In one example, the methods and systems generate for display a first content item, determine a current portion of the first content item and determine a related content segment that is related to the current portion of the first content item such that the related segment is from a second content item. The methods and systems also generate for simultaneous display a first timeline of the first content item, an indicator that indicates a location of the current portion on the first timeline, a second time of the second content item and a segment indicator that indicates location of the related content segment on the second timeline. The methods and systems further receive a selection of the related content segment.

16 Claims, 11 Drawing Sheets

(56)  References Cited

U.S. PATENT DOCUMENTS

| | | | |
|---|---|---|---|
| 2011/0265113 | A1 | 10/2011 | Apfel et al. |
| 2013/0159853 | A1 | 6/2013 | Story et al. |
| 2014/0237536 | A1 | 8/2014 | Jang et al. |
| 2014/0325359 | A1 | 10/2014 | Vehovsky et al. |
| 2015/0063781 | A1 | 3/2015 | Silverman et al. |
| 2015/0301693 | A1 | 10/2015 | Wheeler et al. |
| 2016/0019935 | A1 | 1/2016 | Adam et al. |
| 2019/0200098 | A1 | 6/2019 | Lentzitzky et al. |
| 2020/0128294 | A1 | 4/2020 | Gupta et al. |
| 2020/0312373 | A1 | 10/2020 | Sreedhara |
| 2021/0195292 | A1 | 6/2021 | Gupta et al. |
| 2021/0345003 | A1 | 11/2021 | Gupta et al. |

* cited by examiner

401

416

User Input
Interface

Display

414

410

412

408

406

404

402

400

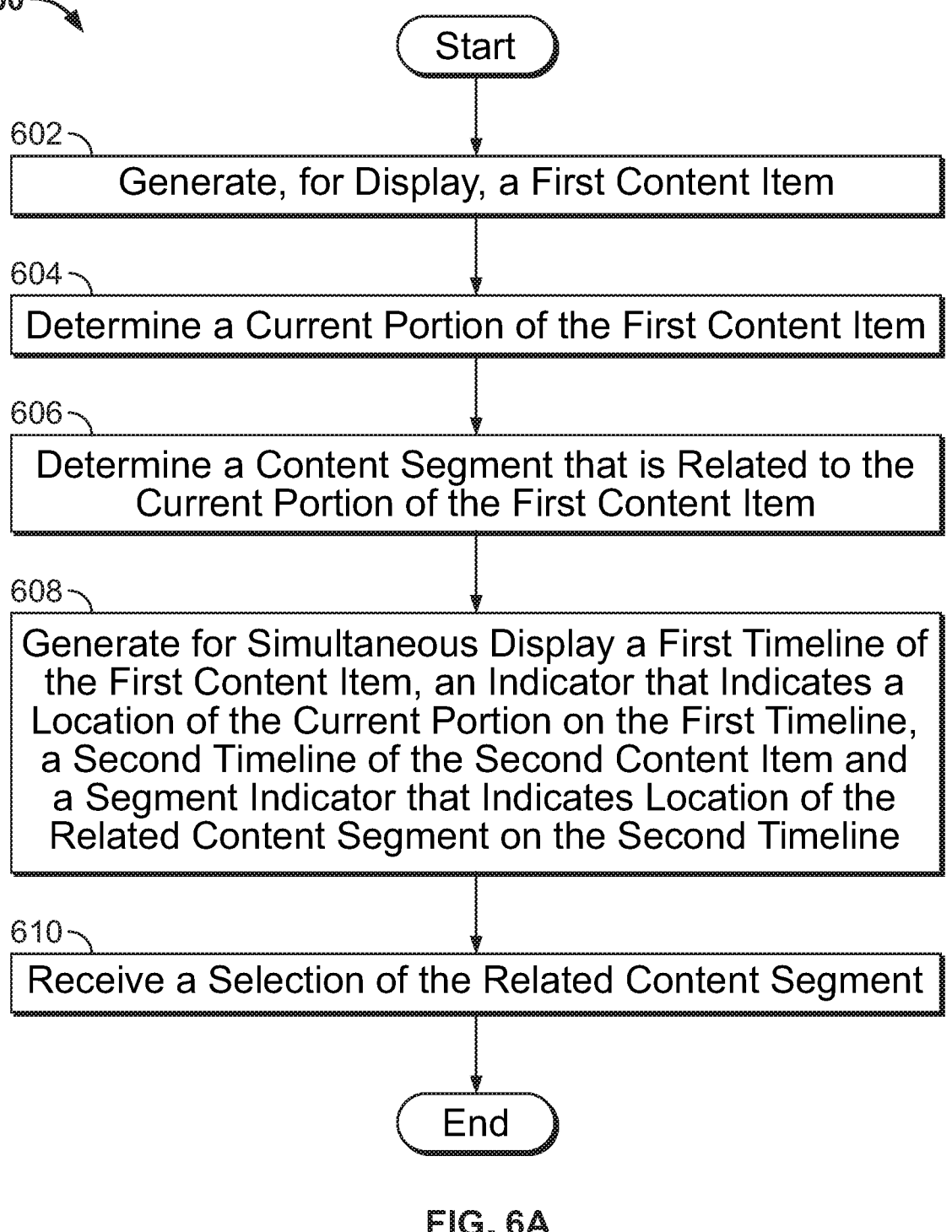

600

Start

602
Generate, for Display, a First Content Item

604
Determine a Current Portion of the First Content Item

606
Determine a Content Segment that is Related to the Current Portion of the First Content Item 608
Generate for Simultaneous Display a First Timeline of the First Content Item, an Indicator that Indicates a Location of the Current Portion on the First Timeline, a Second Timeline of the Second Content Item and a Segment Indicator that Indicates Location of the Related Content Segment on the Second Timeline 610
Receive a Selection of the Related Content Segment End

| Duration of Currently Watched Portion/Segment of the First Content Item | # of Related Segments to be Downloaded | Memory Size of # of Related Segments |
|---|---|---|
| 801 | 2 | 20MB |
| 803 | 5 | 60MB |
| 805 | 8 | 75MB |

SYSTEMS AND METHODS FOR PROVIDING TIMELINE OF CONTENT ITEMS ON A USER INTERFACE

CROSS-REFERENCE TO RELATED APPLICATIONS

This application is a continuation of U.S. patent application Ser. No. 17/372,860, filed Jul. 12, 2021, which is a continuation of U.S. patent application Ser. No. 16/720,286, filed Dec. 19, 2019, (now U.S. Pat. No. 11,095,949), the disclosures of each application are hereby incorporated by reference herein in their entireties.

BACKGROUND

The present disclosure relates to content output systems and, more particularly, to providing timelines of content items on a user interface.

SUMMARY

Systems and methods are described herein for providing timelines of content items on a user interface (UI). The UI elements, such as seekbars, are generated and displayed on the UI for a corresponding content item, such as an episode or a movie currently being watched by the user. The seekbar functions as a control bar, which allows the users to control progress of the content item. However, in today's UI, seekbars are limited to an item of content currently being watched by the user. Other information, such as timelines of content items containing segments related to the currently watched segment and the locations of the segments in their corresponding timelines, are not provided on the UI. In conventional systems, if the user wants to see the timelines of other content items containing related segments and locations of the segments on their respective timelines, the user will need to manually search each of the timelines separately and then return to the content item currently being viewed. Such a manual search by the user unnecessarily wastes times and does not allow for the user to view the timelines of all the content items containing related segments and the segments' respective locations on the timelines at the same time. Thus, currently, there is no easy method of viewing on the UI the timelines of the items containing related segments and the segments' respective locations on their timelines.

The solutions to the problems described above include generating, for simultaneous display, the timeline of the content item currently being viewed and the timelines of other content items with related segments, while the user is currently viewing the content item. For example, when a user is currently watching an episode of a comedy show, other episodes of the comedy show with related segments can be identified, and in turn, timelines of the related episodes, along with timeline of the currently watched episode, can be simultaneously displayed on the UI. Additionally, locations of each of the related segments on their respective timelines can also be displayed on the UI. Accordingly, the methods and systems described herein provide a thorough content consumption experience while saving time for the user, because the user will not have to manually trawl through the episodes to find the related segments along with their respective locations on the timelines.

Systems and methods are described herein for generating timelines of content items including their related segments for simultaneous display on the UI based on the currently watched content item. In some embodiments, the system generates for display a content item (e.g., a television episode). The system determines a current portion of the content item currently being watched and another content item including segments related to the current portion of the content item being watched. The system then generates for simultaneous display a timeline of the content item being watched, an indicator that indicates a location of the current portion of the content item on the timeline of the content item, a timeline of another content item, and a segment indictor that indicates the location of a related content segment on the timeline of the other content item.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6A depicts an illustrative flowchart of a process for providing a timeline of content items on a user interface, in accordance with some embodiments of the disclosure;

FIG. 8B depicts an illustrative example of a chart organizing durations of the currently watched content item of FIG. 8A with the related segments and their corresponding memory sizes in accordance with some embodiments of the disclosure.

DETAILED DESCRIPTION

Methods and systems are described herein for providing timelines or sections of timelines of content items on a user interface (UI). Methods and systems are also described herein for downloading the content segments for display on the UI.

Figure 1A:
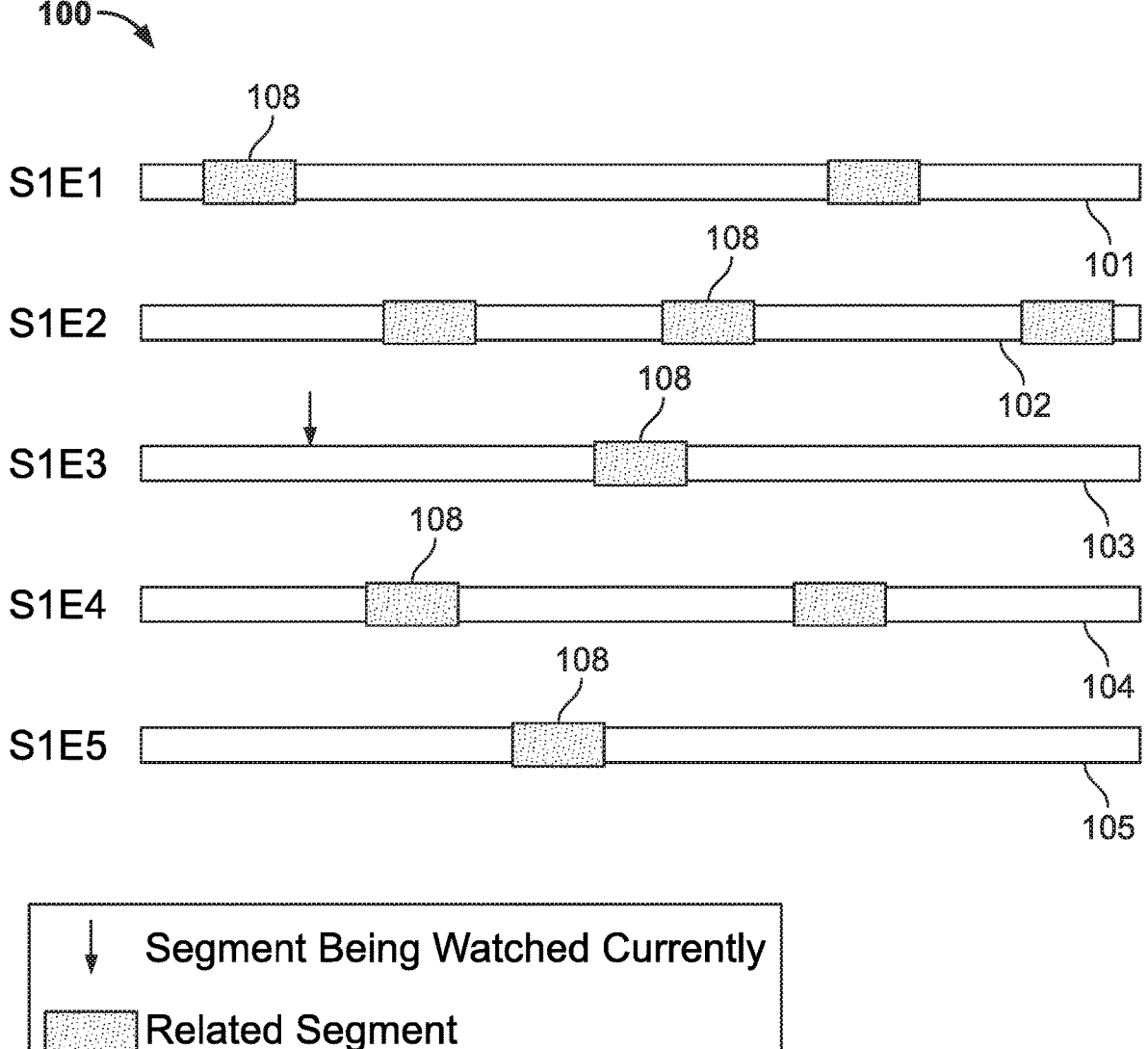
FIG. 1A shows an illustrative example of a system display of a timeline section simultaneously presenting timelines of a currently watched content and of other content items with related segments, in accordance with some embodiments of the disclosure.

FIG. 1A illustrates a view of a timeline section 100 generated for simultaneous display of the timelines of multiple content items on the UI. In one example, a user is currently watching a content item, for example, the third episode of season one (S1E3) of a television show entitled "Seinfeld" (See FIG. 2). FIG. 1A shows the timeline section 100, including timeline 103 of the currently watched content item, S1E3 and timelines 101, 102, 104 and 105 of other content items (different from the original content item) that include segments related to at least a portion of the currently watched content. Such other content, for example, includes the first episode of season one (S1E1), second episode of season one (S1E2), fourth episode of season one (S1E4) and fifth episode of season one (S1E5), respectively. The timeline section display 100 can be displayed on a smartphone, tablet, virtual reality headset, television, any electronic device for content consumption, or any suitable combination thereof. Systems and methods for determining the related segments are discussed in greater detail in connection with Gupta et al., U.S. patent application Ser. No. 16/168,656 filed on Oct. 23, 2018, which is hereby incorporated by reference herein in its entirety. In one embodiment, each of the timelines 101, 102, 103, 104 and 105 in the timeline section 100 includes one or more segment indicators (indicators) 108, which identify locations of their corresponding segments in the section of the timeline. In one example, the number of indicators in each of the timelines is the same. In another example, the number of indicators in each of the timelines is different. In the example shown in FIG. 1A, timeline of the currently watched episode S1E3 and the episode with a related segment S1E5 include one indicator 108, while other episodes with related segments such as S1E1 and S1E4 each include two indicators 108, and S1E2 includes three indicators 108. In some embodiments, a user may select the indicator 108, which results in display of the corresponding related segment. For example, when a touch screen is being used, a user may press on the screen to select a desired indicator. As another example, a user may navigate a cursor or pointer to a desired indicator (e.g., using arrow keys or a mouse) and press a button (e.g., a select button or a mouse button) to select it. Such an action may generate a signal that is received and interpreted by a system as a selection of a segment indicator 108.

Figure 1B:
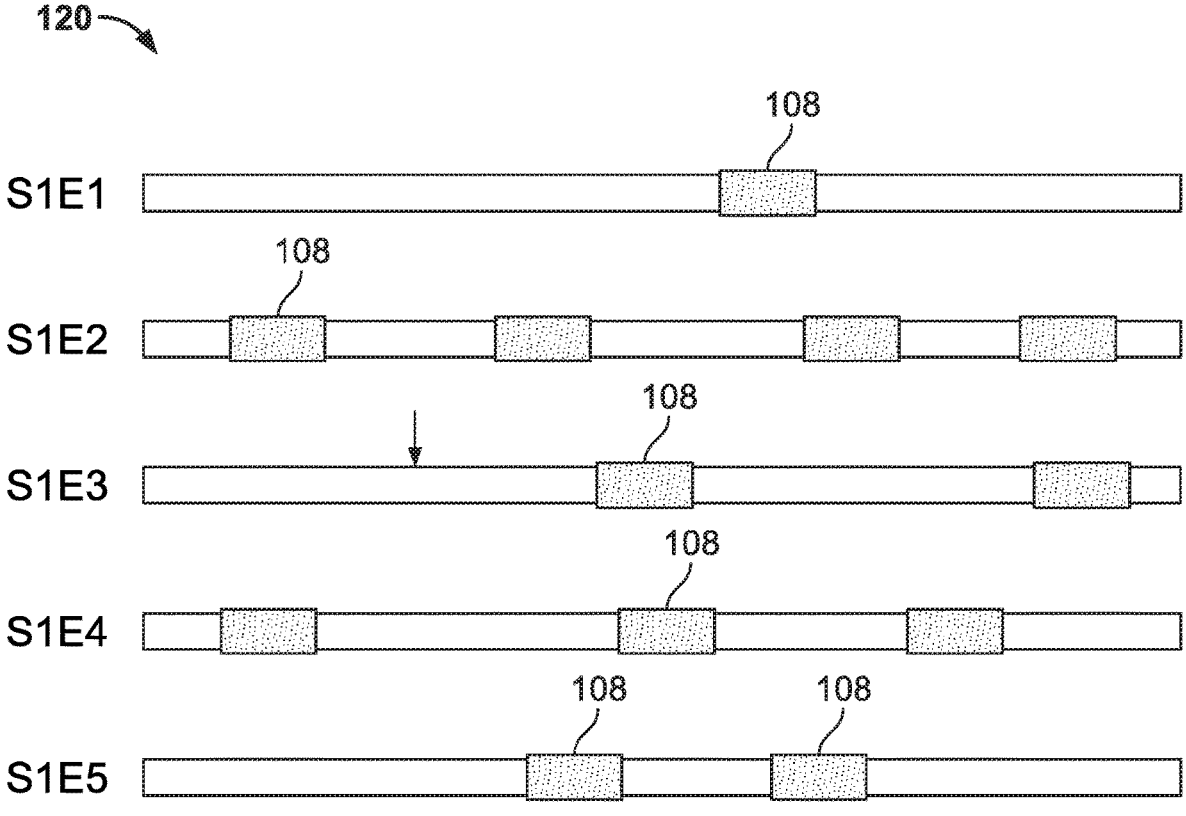
FIG. 1B shows an illustrative example of a change in the timeline section of FIG. 1, in accordance with some embodiments of the disclosure.

FIG. 1B shows an illustrative example of a timeline section 120, which represents an update of the timeline section 100 of FIG. 1A. The timeline section 120 is generated for simultaneous display of updated timelines of multiple content items on the UI by presenting changed/updated timeline of the currently watched content item and the episodes with related segments, in accordance with some embodiments of the disclosure. For example, as the user progresses in timeline 103 of the currently watched content, i.e., S1E3, timeline section 100 of FIG. 1A becomes timeline section 120, as shown in FIG. 1B. In one example, the timeline section 100 in FIG. 1A represents a previous time, and the timeline section 120 in FIG. 1B represents a present time. Specifically, the timeline section 120 illustrates a change in the indicator 108 of timeline 103 of the currently watched episode S1E3, as well as the change in indicators 108 of timelines 101, 102, 104 and 105 of the episodes with related segments in the content items S1E1, S1E2, S1E4 and S1E5, respectively. This is because, as the user continues to watch S1E3, the location of the current portion in timeline 103 changes from the previous time in the timeline section

100 to the present time in the timeline section 120, which results in change of the indicator 108 in timeline 103. This change in the indicator 108 in timeline 103 automatically results in change in the indicators 108 corresponding to locations of the related segments in the content items S1E1, S1E2, S1E4 and S1E5 in timelines 101, 102, 104 and 105, respectively. In one example, one or more of the indicators 108 in timelines 101, 102, 104 and 105, displayed in the timeline section 100 representing the previous time, will not be displayed in timelines 101, 102, 104 and 105 in timeline section 120 representing the current time. In another example, one or more of the indicators 108 in timelines 101, 102, 104 and 105, corresponding to their related segments in the content S1E1, S1E2, S1E4 and S1E5, respectively, that are not previously displayed in the timeline section 100, are currently displayed in timelines 101, 102, 104 and 105, corresponding to their related segments in the content S1E1, S1E2, S1E4 and S1E5, respectively, in the timeline section 120. Accordingly, the number of indicators 108 and the locations of these indicators 108 in each of their respective timelines may change between the timeline section 100, representing the previous time, and the timeline section 120, representing the current time. For example, as illustrated in the timeline section 120 in FIG. 1B, timeline 101 of S1E1 illustrates only one indicator 108 in the present time, as opposed to two indicators 108 in the previous time in timeline 101 of S1E1 in the timeline section 100 in FIG. 1A.

Figure 2:
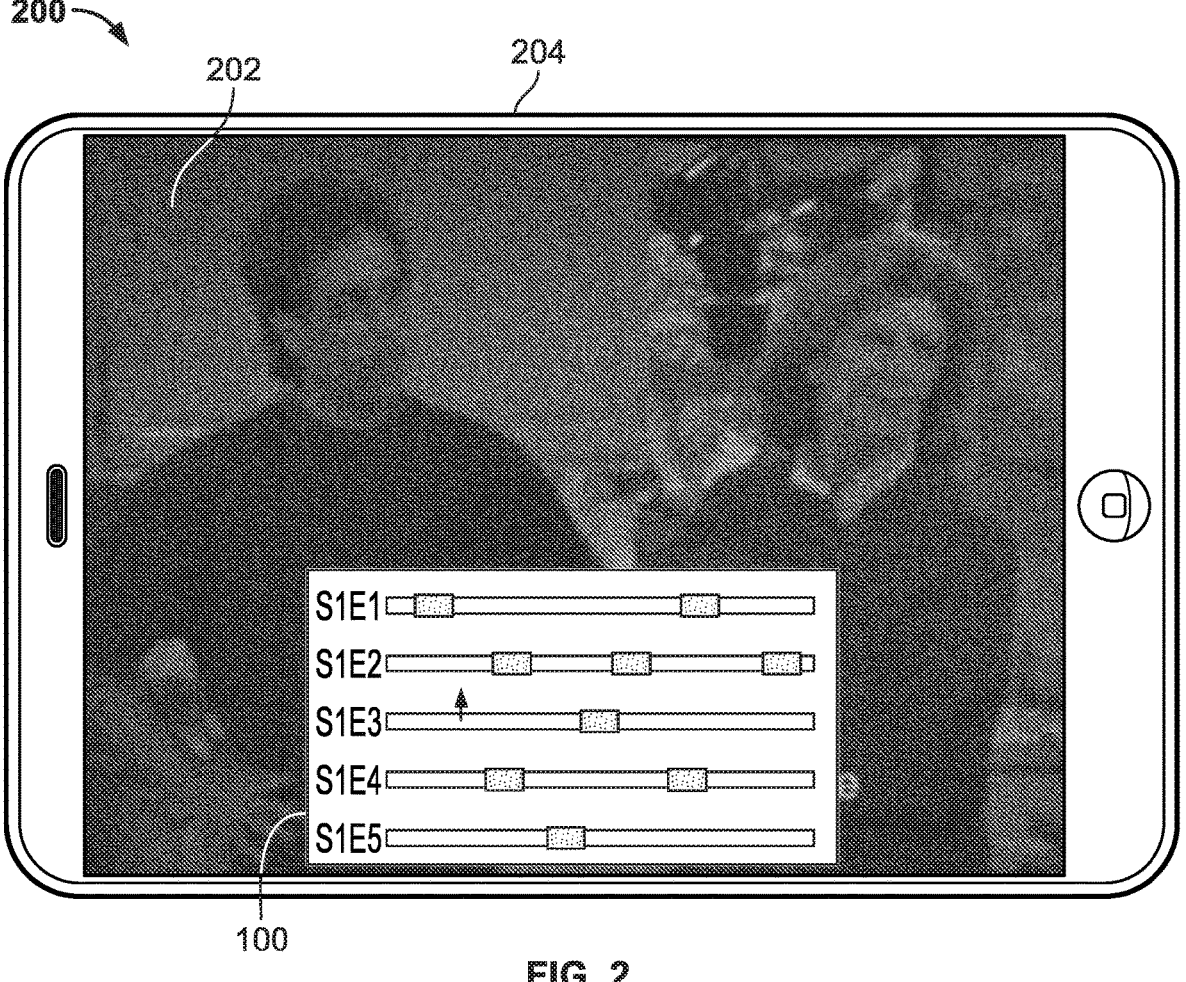
FIG. 2 shows an illustrative example of a content output system display including the timeline section of FIG. 1, in accordance with some embodiments of the disclosure.

FIG. 2 shows an illustrative example of a content output system display 200 simultaneously presenting timeline section 100 in accordance with some embodiments of the disclosure. For example, the user may be currently watching the third episode of season one (S1E3) of a television show entitled "Seinfeld," as a currently presented content 202 shown by currently presenting section 204. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, playlists, electronic books, social media, applications, games, and/or any other media and/or combination of the same. Content may be recorded, played, displayed or accessed by devices, but can also be part of a live performance. The content output system display 200 also includes the timeline section 100 shown on the currently presenting section 204. Accordingly, the currently presenting section 204 may display the currently presented content 202 along with the timeline section 100. The content output system display 200 can belong to a smartphone, tablet, virtual reality headset, television, any electronic device for content consumption, or any suitable combination thereof.

Figure 3:
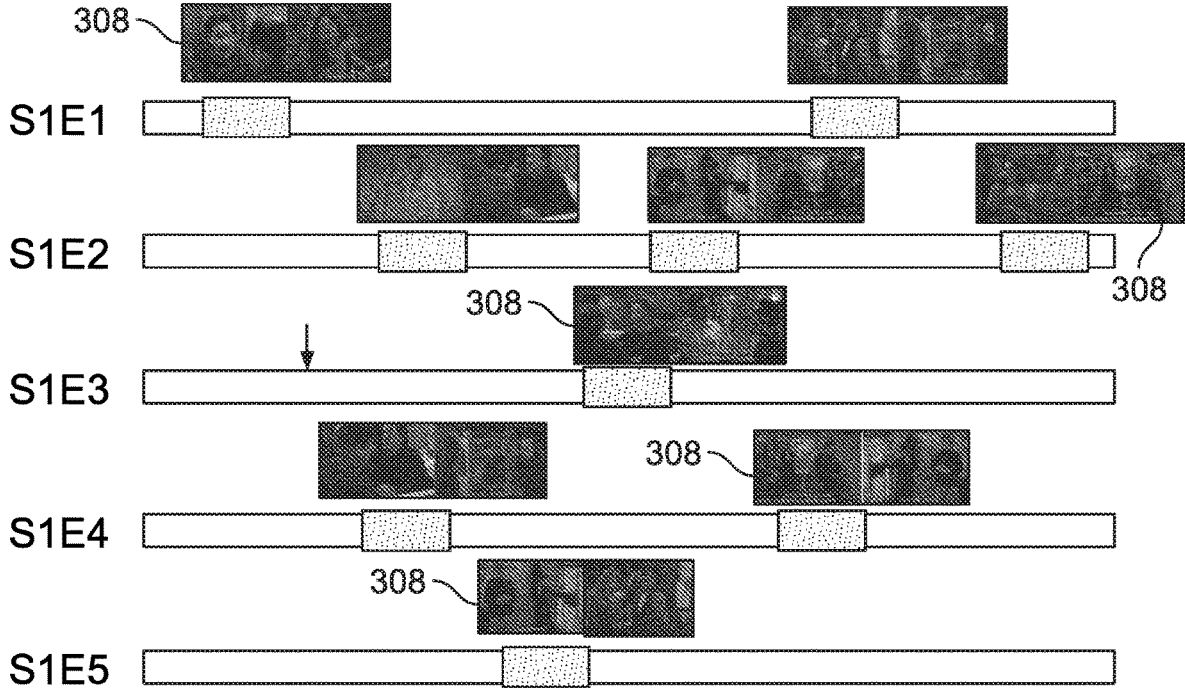
FIG. 3 shows an illustrative example of the timeline section of FIGS. 1A and 2 with simultaneous presentation of the screencaps, in accordance with some embodiments of the disclosure.

FIG. 3 shows an illustrative example of the timeline section 100 of FIG. 1 with simultaneous presentation of screencaps 308 in accordance with some embodiments of the disclosure. For example, a screencap 308 corresponding to each of the indicators 108 in their corresponding segments is displayed on the timeline section 100. The screencap 308 provides a more immersive experience to a user while the user navigates through each of the related segments in the content S1E1, S1E2, S1E4 and S1E5 while watching a current portion or segment of the content S1E3. Screencaps provide a user with an informative view of the related segments. In some embodiments, a user may select the screencap 308 of the indicator 108, which results in display of the corresponding segment. In some embodiments, a user may select the indicator 108, which results in display of the corresponding related segment. For example, when a touch screen is being used, a user may tap or press on the screen to select a desired screencap. As another example, a user may navigate a cursor or pointer to a desired screencap (e.g., using arrow keys or a mouse) and press a button (e.g., a select button or a mouse button) to select it. Such an action may generate a signal that is received and interpreted by a system as a selection of a screencap 308.

In some embodiments, upon the user selection of the screencap of one of the related segments in another content while watching the current portion or segment of the content, the user is directed to the related segment for display of the related segment. In one embodiment, the related segment in the another content is downloaded for display for a specific time and upon completion of the specific time, the current portion or segment of the content is displayed back on the UI. In another embodiment, the related segment in the another content is downloaded for display for an entire time and completion of the display of the related segment, the current portion or segment of the content is displayed back on the UI. In a further embodiment, the related segment in the another content is downloaded for display for an entire time and completion of the display of the related segment, another related segment in the same another content immediately followed by the related segment is displayed on the UI, thus the user continues to view the another content. In some examples, when the user taps on the screencap 308 of S1E2 while watching the current segment of the content S1E3, the user is directed to the segment corresponding to the screencap 308 of S1 E2 and the segment corresponding to the screencap 308 of S1E2 is displayed on the UI. In one example, segment corresponding to the screencap 308 of S1E2 is displayed on the UI for a short period of time and upon completion of this period of time, the current segment of the content S1E3 is displayed back on the UI. In another example, upon completion of the segment corresponding to the screencap 308 of S1E1, the current segment of the content S1E3 is displayed back on the UI. In a further example, upon completion of the segment corresponding to the screencap 308 of S1E1, another segment of S1E2 immediately following the current segment S1E2 is displayed on the UI as the user continues to watch the S1E2.

In some embodiments, the screencaps 308 of the related segments, S1E1, S1E2, S1 E4 and S1E5 are downloaded for a specific period of time (e.g., 5 seconds) in order for the related segments to start playing without buffering for a seamless experience to a user while the user navigates through these related segments.

In some embodiments, a segment package includes a location of current portion of content, e.g. S1 E3, list of the related segments e.g. S1E1, S1E2, S1E4 and S1E5; and sample rate of the screencaps 308 of these related segments. In one example, the sample rate of the screencaps 308 is 1 per 5 seconds such that one screencap 308 is downloaded every 5 seconds. In one embodiment, the related segment includes episodes, e.g. E1, E2, E4 and E5 associated with scene of the related segment, time at which the scene begins and ends, and the screencaps 308 of the scene. In some embodiments, each segment package is assigned a certain connection value based on how strong or weak a connection is to download the related segments. In one example, the connection value is 1, the connection to download the related segment is weak. In another example, the connection value is 100, the connection to download the related segment is strong. In some embodiments, in order to conserve bandwidth, system downloads the segment package only when necessary. For example, there are 200 segments in a movie, each segment has average of 10 related segments, each related segment has 5 screencaps and each screencap is about 20 Kb, other connection metadata is 10 Kb and 5 seconds of the connection of each segment. Thus, the total size of the entire move is 220 MB and downloading all this at the start of the movie will make the system very inefficient, therefore the system functions to download the segment package of the related segment only when the user is nearing that segment.

Figure 4:
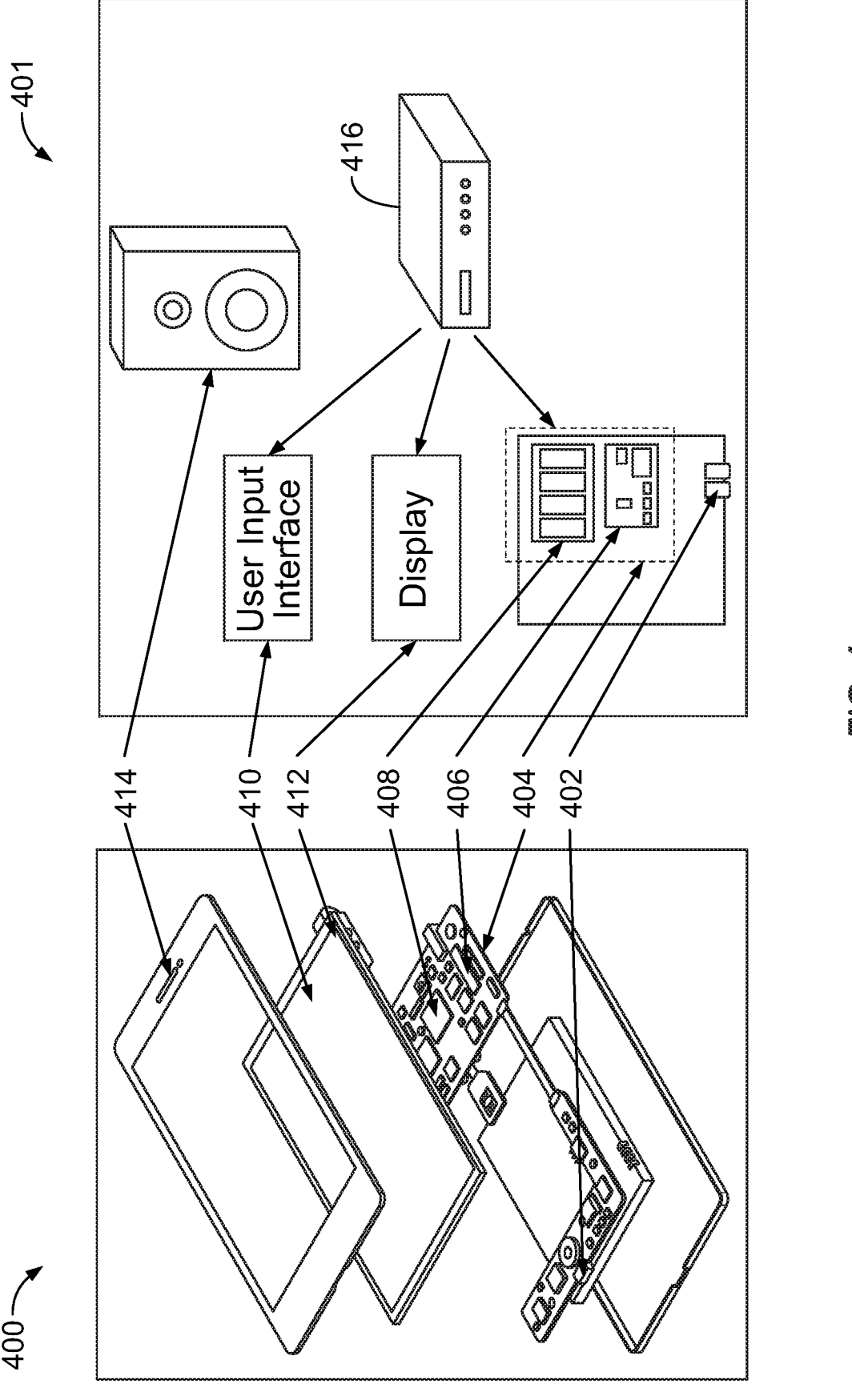
FIG. 4 is a block diagram of an illustrative content output system, in accordance with some embodiments of the disclosure.

Users may access content from one or more of their devices. FIG. 4 shows generalized embodiments of a device capable of presenting content on a display 412. For example, display 412 may belong to a smartphone device. In another example, display 412 may belong to a user television equipment system. User television equipment system with display 412 may include a set-top box 416. Set-top box 416 may be communicatively connected to speaker 414 and display 412. In some embodiments, display 412 may be a television display or a computer display. In some embodiments, set top box 416 may be communicatively connected to user interface input 410. In some embodiments, user interface input 410 may be a remote control device. Set-top box 416 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of devices are discussed below in connection with FIG. 5. Each one of device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to monitor words spoken by a user and determine whether they match words in the content that is being output. In some implementations, any action performed by control circuitry 404 may be based on instructions received from the application.

In client-server based embodiments, control circuitry 404 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein, including, for example, timeline of the content item and timelines of the related content segments. Storage 408 may also be used to store segment indicator that indicates location of current portion in the timeline of the content item and segment indicators that indicates locations in the timelines of the related content segments. Storage 408 may also be used to store screencaps of the related content segments. Storage 408 may also be used to store memory size of the content item and the related content segments. Storage 408 may further be used to store current bandwidth of a user's device on which to download and display the content item and the related content segments. Nonvolatile memory may also be used (e.g., to launch a boot-up routine and other instructions). Cloud-based storage, described in relation to FIG. 5, may be used to supplement storage 408 or instead of storage 408. In some embodiments, a database is accessible at the cloud-based storage, where the database stores metadata files of content, a look-up table mapping content segments or timestamped content to characteristics or related content segments, any suitable reference for control circuitry to retrieve when determining a characteristic of a current portion of content or related content segments, or any suitable combination thereof.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment

400. Circuitry 404 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414.

The content application may be implemented using any suitable architecture. For example, it may be a stand-alone application wholly-implemented on each one of device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410.

In some embodiments, the application is a client-server based application. Data for use by a thick or thin client implemented on each one of device 400 and user equipment system 401 is retrieved on-demand by issuing requests to a server remote to each one of device 400 and user equipment system 401. In one example of a client-server based content application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400.

In some embodiments, the content application is downloaded and interpreted or otherwise run by an interpreter or virtual machine (run by control circuitry 404). In some embodiments, the content application may be encoded in the ETV Binary Interchange Format (EBIF), received by control circuitry 404 as part of a suitable feed, and interpreted by a user agent running on control circuitry 404. For example, the content application may be an EBIF application. In some embodiments, the content application may be defined by a series of JAVA-based files that are received and run by a local virtual machine or other suitable middleware executed by control circuitry 404. In some of such embodiments (e.g., those employing MPEG-2 or other digital media encoding schemes), the content application may be, for example, encoded and transmitted in an MPEG-2 object carousel with the MPEG audio and video packets of a program.

Figure 5:
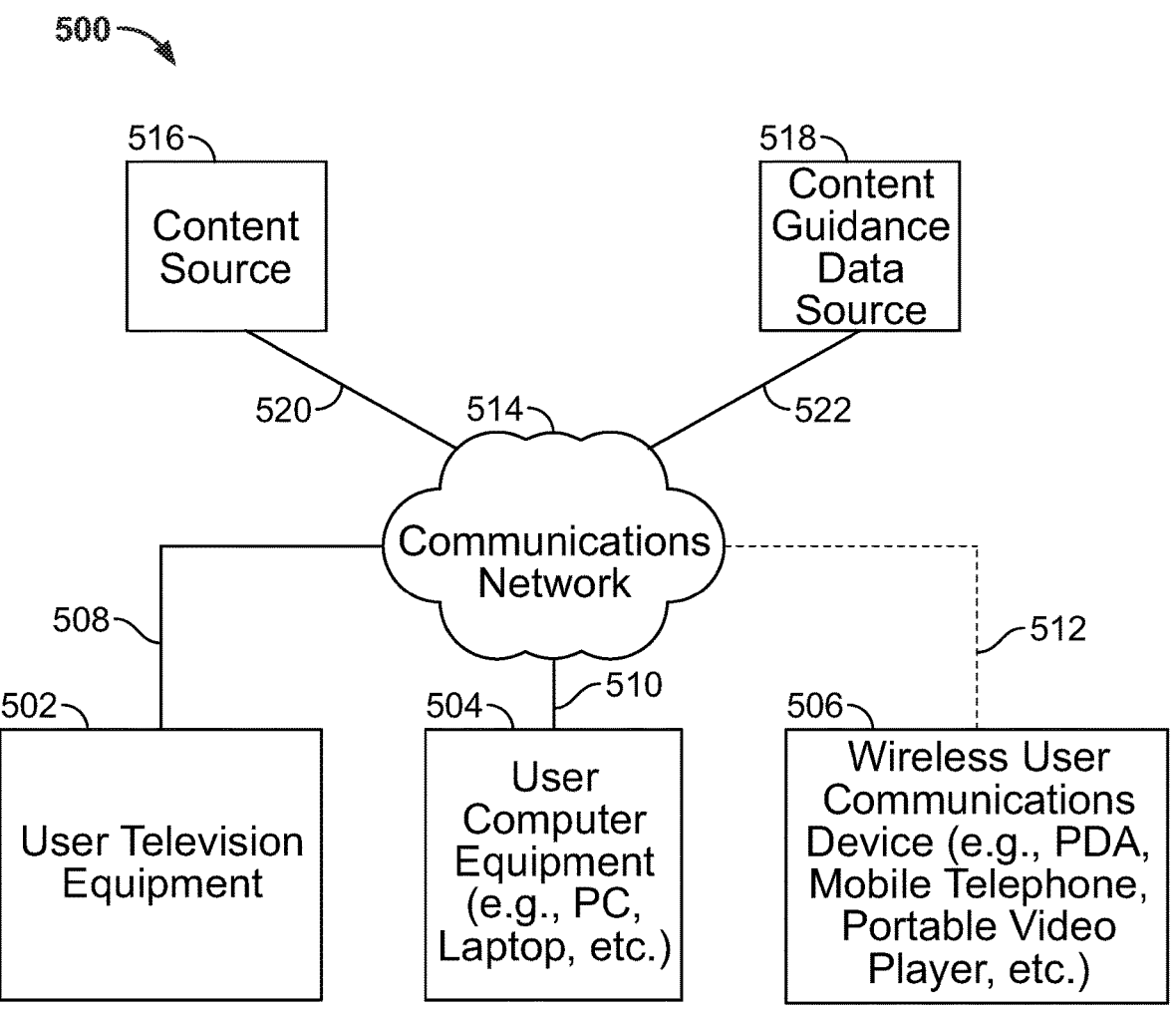
FIG. 5 is a block diagram of an illustrative device, in accordance with some embodiments of the disclosure.

Each one of device 400 and user equipment system 401 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or devices and may be substantially similar to devices described above. Devices, on which an application may be implemented, may function as a standalone device or may be part of a network of devices. Various network configurations of devices may be implemented and are discussed in more detail below.

A device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The application may have the same layout on various different types of user equipment or may be tailored to the display capabilities of the user equipment. For example, on user computer equipment 504, the content application may be provided as a web site accessed by a web browser. In another example, the content application may be scaled down for wireless user communications devices 506.

In system 500, there is typically more than one of each type of device but only one of each is shown in FIG. 5 to avoid overcomplicating the drawing. In addition, each user may utilize more than one type of device and also more than one of each type of device.

In some embodiments, a device (e.g., user television equipment 502, user computer equipment 504, wireless user communications device 506) may be referred to as a "second device." For example, a second device may provide an interface for adjusting settings and display preferences of the first device. In some embodiments, the second device is configured for interacting with other second devices or for interacting with a social network. The second screen device can be located in the same room as the first device, a different room from the first device but in the same house or building, or in a different building from the first device.

The user may also set various settings to maintain consistent application settings across in-home devices and remote devices. For example, if a user enables selection of related content segments on their personal computer at their office, this feature would also be enabled on the user's in-home devices (e.g., user television equipment and user computer equipment) as well as the user's mobile devices, if desired. Therefore, changes made on one device can change the content experienced on another device, regardless of whether they are the same or a different type of device. In addition, the changes made may be based on settings input by a user, as well as user activity monitored by the content application. In addition, two devices can work together to provide functionality for the user. For example, a first device can determine a current portion of the content being output to a user and instruct a second device to determine content segments related to the current portion of the content.

The devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the devices may be provided by one or more of these communications paths but are shown as a single path in FIG. 5 to avoid overcomplicating the drawing.

Although communications paths are not drawn between devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 502-11x, etc.), or other short-range communication via wired or wireless paths. BLU-ETOOTH is a certification mark owned by Bluetooth SIG, INC. The devices may also communicate with each other directly through an indirect path via communications network 514.

System 500 includes content source 516 and content data source 518 coupled to communications network 514 via communication paths 520 and 522, respectively. Paths 520 and 522 may include any of the communication paths described above in connection with paths 508, 510, and 512. Communications with the content source 516 and content data source 518 may be exchanged over one or more communications paths but are shown as a single path in FIG. 5 to avoid overcomplicating the drawing. In addition, there may be more than one of each of content source 516 and content data source 518, but only one of each is shown in FIG. 5 to avoid overcomplicating the drawing. If desired, content source 516 and content data source 518 may be integrated as one source device. Although communications between sources 516 and 518 with devices 502, 504, and 506 are shown as through communications network 514, in some embodiments, sources 516 and 518 may communicate directly with devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote content server used to store different types of content (including video content selected by a user), in a location remote from any of the devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content data source 518 may provide data related to the content. Content data may be provided to the devices using any suitable approach. In some embodiments, the content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, content data from content data source 518 may be provided to user's equipment using a client-server approach. For example, a user equipment device may pull content data from a server, or a server may push content data to a user equipment device. In some embodiments, a content application client residing on the user's equipment may initiate sessions with source 518 to obtain content data when needed, e.g., when the content data is out of date or when the device requests the data. Content data may be provided to the user equipment with any suitable frequency (e.g., continuously, daily, a user-specified period of time, a system-specified period of time, in response to a request from user equipment, etc.). Content data source 518 may provide devices 502, 504, and 506 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The content data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of less or more than one year. The content data may include a model (e.g., a survivor model) used for generating a score that indicates a likelihood a given user will terminate access to a service/source. For example, the application may monitor a user's engagement with content to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content data may include metadata files pertaining to the content or content segments e.g., characteristics of content portions, content segments related to a current portion of content based on a characteristic, timelines of content portions such a timeline of the content and timelines of the related content segments, indicator that indicates location of the current portion on the timeline of the content, indicators that indicate locations of the related content segments on their respective timelines, screencaps of the related segments, memory size of the content item and the related segments. The content data may also include user profiles used to determine likelihoods of the user navigating away from or to a content portion or segment. For example, content data may include information characterizing content such as the director, producer, actors, activities occurring during the content, locations the content was created, any description of the content context or the content production, or any suitable combination thereof.

Applications may be, for example, stand-alone applications implemented on devices. For example, the application may be implemented as software or a set of executable instructions which may be stored in storage 408 and executed by control circuitry 404 of each one of device 400 and user equipment system 401. In some embodiments, applications may be client-server applications where only a client application resides on the device, and server application resides on a remote server. For example, applications may be implemented partially as a client application on control circuitry 404 of each one of device 400 and user equipment system 401 and partially on a remote server as a server application (e.g., content data source 518) running on control circuitry of the remote server. When executed by control circuitry of the remote server (such as content data source 518), the application may instruct the control circuitry to generate the content displays and transmit the generated displays to the devices. The server application may instruct the control circuitry of the content data source 518 to transmit data for storage on the device. The client application may instruct control circuitry of the receiving user equipment to generate the content displays.

Content and/or content data delivered to devices 502, 504, and 506 may be over-the-top (OTT) content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 500 is intended to illustrate a number of approaches, or network configurations, by which devices and sources of content and content data may communicate with each other for the purpose of accessing content and providing the ability generate for simultaneous display the timelines of the content and the related segments, an indicator indicating location of the current portion of the content on the content timeline and indicators indicating locations of the related segments on their respective timelines. The embodiments described herein may be applied in any one or a subset of these approaches, or in a system employing other approaches for downloading and displaying the content. The following four approaches provide specific illustrations of the generalized example of FIG. 5.

In one approach, devices may communicate with each other within a home network. Devices can communicate with each other directly via short-range point-to-point communication schemes described above, via indirect paths through a hub or other similar device provided on a home network, or via communications network 514. Each of the multiple individuals in a single home may operate different devices on the home network. As a result, it may be desirable for various content application information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content. For example, a user may use content navigation button on one device while the content is transmitted to a second device to be generated for display.

In a second approach, users may have multiple types of user equipment by which they access content. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, timelines and the locations of the content and the related segments display enablement, or other settings) on the online content application to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home can use their application to communicate directly with content source 516 to access content. Specifically, within a home, users of user television equipment 502 and user computer equipment 504 may access the application to navigate among and locate desirable content. Users may also access the application outside of the home using wireless user communications devices 506 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more content data sources 518. In addition, or in the alternative, the remote computing sites may include other devices, such as user television equipment 502, user computer equipment 504, and wireless user communications device 506. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, devices can use cloud resources for processing operations such as the processing operations performed by processing circuitry described in relation to FIG. 4.

Any one or more of device 400 and user equipment system 401 of FIG. 4 and user television equipment 502, user computer equipment 504, and wireless user communications device 506 of FIG. 5 can be used to provide a thorough and efficient content consumption experience. For example, the devices of the present disclosure can generate for simultaneous display timelines of the content and the related segments, an indicator indicating location of the current portion of the content on the content timelines and indicators indicating locations of the related segments on their respective timelines. Further details of the present disclosure are discussed below in connection with the flow-charts of FIGS. 6-8.

FIG. 6A depicts an illustrative flowchart of a process 600 for providing timeline of content segments on a user interface, in accordance with some embodiments of the disclosure. It should be noted that the steps of process 600 can be performed by control circuitry 404 of FIG. 4. Control circuitry 404 may be part of a device having a display 412 (e.g., a device that may have any or all of the functionality of user television equipment 502, user computer equipment 504, and/or wireless communications device 506 of FIG. 5), part of a remote server separated from the user equipment by way of a communication network (e.g., communication network 514 of FIG. 5), or distributed over a combination of both.

At step 602, the system generates, for display, a first content item. The system may generate content for display on a display 412 including LCD and OLED displays used for mobile devices, 3D displays, video projectors, or any other suitable equipment for displaying visual images. Display is not limited to visual content, as content may have an audio and visual component or only one of either audio or visual components. Display may further include transmission of audio content for listening through a speaker 414 such as stereo speakers, headphones, portable speakers, or any other suitable device that outputs audio.

At step 604, the system determines a current portion of the first content item. In one example, the first content item is S1E3 of the show "Jerry Seinfeld" as illustrated and discussed above with respect to FIGS. 1-3. A current portion can include at least one of audio and visual components of content. For current portions comprising visual components, the portion may be a single video frame or series of video frames (e.g., video frames that comprise a specific movement that an actor does). For example, the current portion of a television series may be the gesture that two characters make before arrival of a third character. As another example, the current portion may be a single video frame that shows an integrated sponsor logo on a computer in the foreground of the frame. For current portions comprising audio components, the portion may include a spoken word, phrase, or music. For example, the current portion of a stand-up comedy album may be the first occurrence of a punchline that the comedian makes in reference to towards the end of the album. As another example, the current portion of a movie can be a series of video frames accompanied by a musical score. The system may determine a current portion of the first content item during its output by using the content presented at a predetermined time before and after the frame currently being presented to understand context for potential current portions (e.g., if the user is currently watching at the 30:00-minute mark, the system may use 28:00-32:00 to determine the current portion). Current portions may also be predetermined by the content provider or by control circuitry (e.g., control circuitry 404) prior to the generation for display of the content. In some embodiments, control circuitry determines the current portion of the first content item. For example, the control circuitry can determine the portion of a movie being consumed that is accompanied by one song in a musical score.

At step 606, the system determines a content segment that is related to the current portion of the first content item such that the related content segment is from a second content item. In one example, the second content item is same as the first content item. For example, the first and the second content items are the currently watched episode, S1E3 of the show "Jerry Seinfeld," however, the current portion may be at the 30:00 minute mark and the related content segment maybe before the 30:00 minute mark, e.g. 20:00 minute mark or after the 30:00 minute mark, e.g. 40:00 minute mark. In another example, the second content item is different from the first content item. For example, the first content item is the currently watched episode, S1E3 of the show "Jerry Seinfeld," and the second content item is a different episode, e.g. S1E1, S1E2, S1E4 or S1E5.

In some embodiments the system determines the related content segment based on characteristics of the current portion of the first content item. In one embodiment, the system determines a characteristic of the current portion of the first content item. A characteristic can include featured actors, music, sound effects, location, plot information, segment description, special effects, time of occurrence in the content, screenwriter, director, producer, integrated sponsor, brightness, dialogue, any feature that classifies audio or visual content, or any suitable combination thereof. The characteristic may be determined during content output through facial recognition features, image-to-text parsing, or any other suitable recognition algorithm. The characteristic may also be determined prior to content output and retrievable from a metadata file of the content. In some embodiments, control circuitry 404 determines the characteristic of the current portion of the first content item. For example, the control circuitry can determine that a characteristic of a portion of a movie is its orchestral music score that pairs with dramatic scenes. In this example, each frame of the movie could be annotated with a corresponding musical score that the system uses to determine the characteristic. Another way that the characteristic could be determined in this example is by using a music recognition algorithm using speech processing and a database to identify the song that characterizes the portion of the movie. In another embodiment, the system may begin determining a related content segment by first determining the likelihood of the user navigating away from the current portion of the content. For example, the system determines segments related to a scene with a specific character upon determining that user is likely to navigate away because the specific character is not interesting to the user. In another example, the system may determine that the user is likely to navigate away from a current portion in a television episode because when the user has previously viewed this portion or similar portions, the user has navigated away a sufficient number of times before to a segment in a previous episode.

Content segments related to the current portion may be related based on a shared characteristic with the current portion of the content. In one embodiment, the related content segment has the same character as one in the current portion. This relationship is relevant for situations where a user wishes to seek a segment prior to the current portion or after the current portion. For example, when the user returns to watching an episode in the middle of a season of episodes after not watching for over a month, the user may be confused as to what last happened to the character when the user last watched the content. To give the user quick access to content from previous episodes, the system may buffer segments of previous episodes that include the character.

Content segments may be related to the current portion based on an indirect relationship as opposed to a direct relationship (e.g., a shared actor, musical composer, activity, etc.). An indirect relationship may include a chronological proximity to the current segment (e.g., segments may be related because they occur chronologically after the current portion). For example, scenes five and six are related to scene four because they occur consecutively after the fourth scene. This relationship may be used when the system has determined a characteristic and is identifying the closest segment with that characteristic before or after the current portion. In one example, the user profile indicates that the user likes the music of a movie the user is watching, and the system will find the segments closest to the current portion that also have the background music. The user in this example may prefer to stay within a certain time of the current portion as opposed to navigating farther away than a few segments away. An indirect relationship may include an opposing relationship to the characteristic of the current portion. For example, the current portion is characterized as violent, and the user does not like violence. The system may determine that the user is likely to navigate away to the next scene without violence, determining related segments by using their lack of the characteristic or having attributes that are the opposite of the characteristic. Systems and methods for determining the related content segments are discussed in greater detail in connection with Gupta et al., U.S. patent application Ser. No. 16/168,656 filed on Oct. 23, 2018, which is hereby incorporated by reference herein in its entirety.

At step 608, the system generates for simultaneous display a first timeline of the first content item, an indicator that indicates a location of the current portion on the first timeline, a second timeline of the second content item and a segment indicator that indicates location of the related content segment on the second timeline. At step 610, the system receives a selection of the related content segment. In one embodiment, the system receives the selection via the segment indicator corresponding to the related content segment. In some embodiments, the system displays a portion of the related content segment corresponding to the segment indicator. In another embodiment, the system receives the selection via the displayed portion of the related content segment. In some embodiments, the system displays the selected related segment. Accordingly, the process 600 repeats in a loop until the user is no longer watching any of the first or the second content items.

In some embodiments, for example, a user is viewing highlights of a sports program (not shown). An original game is another content that includes segments related to the highlights. The system generates for display a timeline section for example that includes timeline of the sports program including indicators identifying locations of segments of the sports highlights and a timeline of the original game including indicators identifying locations of segments related to each segment of the sports highlights. In one embodiment, for example, the sports highlights program only involves a specific athlete, Kobe Bryant, the system generates for display the timeline section for example that includes timeline of the sports program including indicators identifying locations of segments of the sports highlights and timelines of multiple original games with Kobe Bryant including indicators identifying locations of segments corresponding to each of the multiple original games related to one or more of the segments of the sports highlights.

Figure 6B:
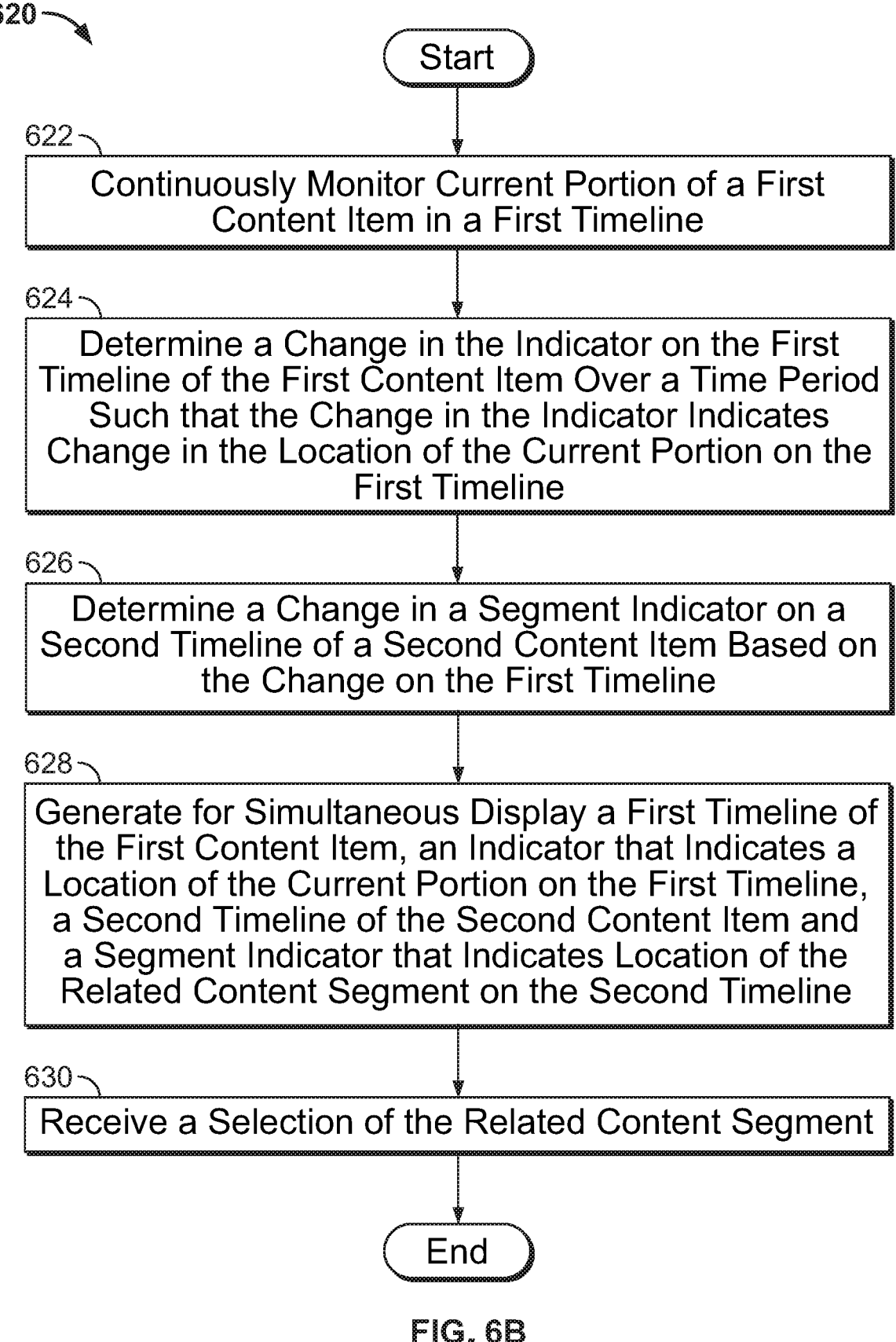
FIG. 6B depicts an illustrative flowchart of a process for providing an updated timeline of the content items on the user interface, in accordance with some embodiments of the disclosure.

FIG. 6B depicts an illustrative flowchart of a process 620 for providing updated timeline of content segments on a user interface, in accordance with some embodiments of the disclosure. It should be noted that the steps of process 620 can be performed by control circuitry 404 of FIG. 4. Control circuitry 404 may be part of a device having a display 412 (e.g., a device that may have any or all of the functionality of user television equipment 502, user computer equipment 504, and/or wireless communications device 506 of FIG. 5), part of a remote server separated from the user equipment by way of a communication network (e.g., communication network 514 of FIG. 5), or distributed over a combination of both. At step 622, the system continuously monitors the current portion of the first content item in the first timeline. For example, as the user continues to watch the first content item over a time period, the user progresses in the first timeline of the first content item. This results in change of the indicator of the current portion in the first timeline indicating the changed location of the current portion in the first timeline over the time period. At step 624, the system determines a change in the indicator on the first timeline of the first content item over a time period such that the change in the indicator indicates change in the location of the current portion on the first timeline. The change in the indicator of the current portion in the first timeline automatically results in change in the segment indicator of the related content segment in the second timeline indicating the changed location of the related content segment in the second timeline over the time period. At step 626, the system determines a change in segment indicator on a second timeline of a second content item based on the change on the first timeline. At step 628, the system generates for simultaneous display the first timeline of the first content item, the changed indicator that indicates the changed location of the current portion on the first timeline, the second timeline of the second content item and the changed segment indicator that indicates the changed location of the related content segment on the second timeline. At step 630, the system receives a selection of the related content segment. In one embodiment, the system receives the selection via the changed segment indicator corresponding to the related content segment. In some embodiments, the system displays a portion of the related content segment corresponding to the changed segment indicator. In another embodiment, the system receives the selection via the displayed portion of the related content segment. In some embodiments, the system displays the selected related segment. Accordingly, the process 620 repeats in a loop until the user is no longer watching any of the first or the second content items.

Any one or more of device 400 and user equipment system 401 of FIG. 4 and user television equipment 502, user computer equipment 504, and wireless user communications device 506 of FIG. 5 can be used to provide a thorough and efficient content download experience. In some embodiments, the devices of the present disclosure download the related content segments (described above with respect to FIGS. 1-3) for display. In one embodiment, the system downloads the related segment when the user navigates nearby the related content segment. Further details for downloading the related content segments are described in connection with flowchart of FIG. 7.

Figure 7:
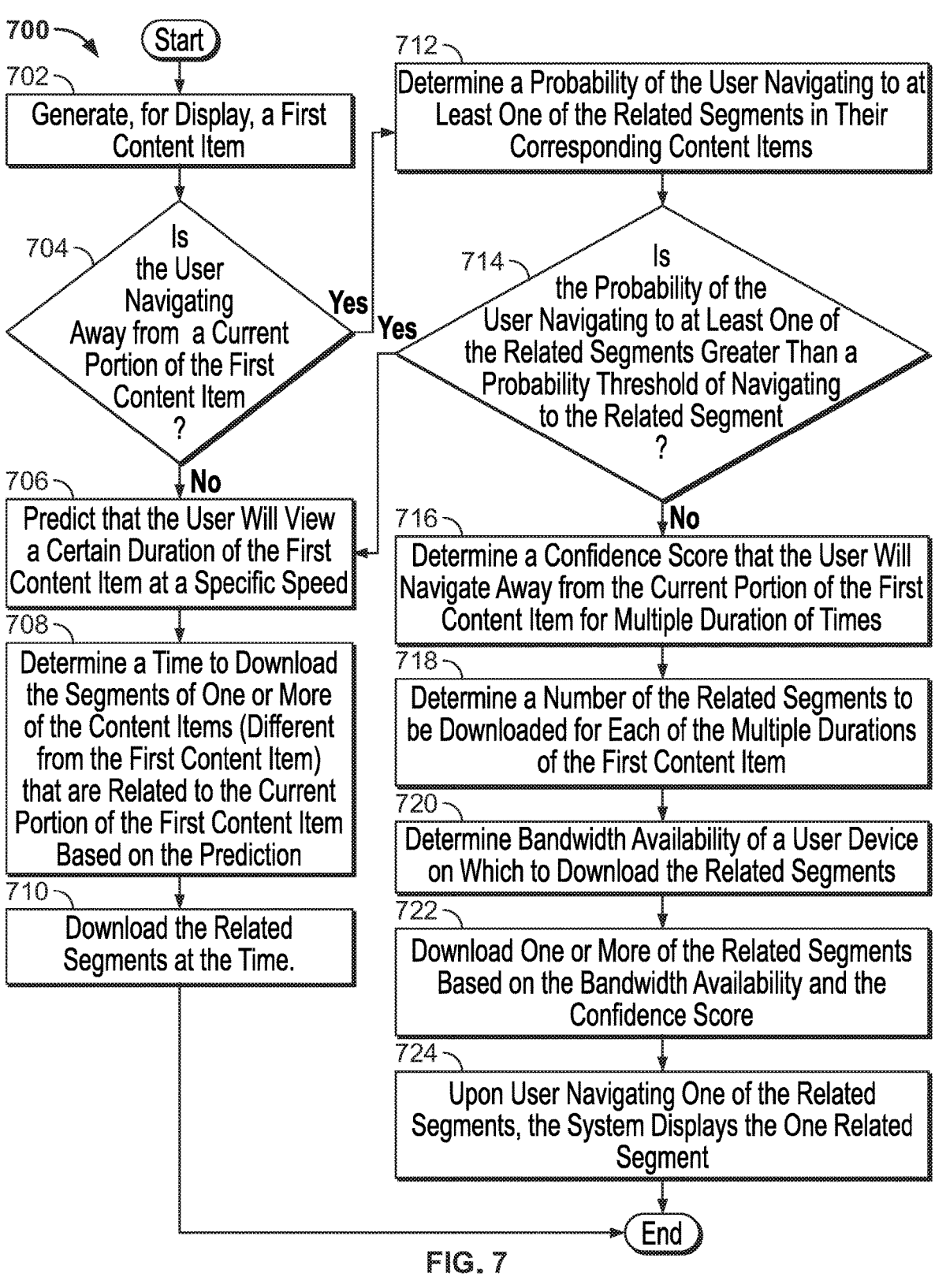
FIG. 7 depicts an illustrative flowchart of a process for downloading related content items for display on a user interface, in accordance with some embodiments of the disclosure.

FIG. 7 depicts an illustrative flowchart of a process 700 for downloading the related content segments for display, in accordance with some embodiments of the disclosure.

At step 702, the system generates, for display, the first content item. At step 704, the system determines whether the user is navigating away from a current portion of the first content item. In one example, the navigating away may include navigate another portion of the first content item. For example, the current portion is scene 3 in S1E3 of the show "Seinfeld" and the user skips from the scene 3 to select scene 5 in S1E3. As another example, when the user may elect to pause at the scene 3 in S1E3, the system may characterize this action as a navigation away (e.g., the system will determine a probability that the user will pause at a certain scene in this S1E3). If the system determines at step 704 that the user is not navigating away from the current portion of the first content item, then the system proceeds to step 706 to predict that the user will view a certain duration of the first content item at a specific speed. For example, the system predicts that the user will watch at least five scenes of the S1E3 of the show "Seinfeld" within ten minutes of period. At step 708, the system determines a time to download the segments of one or more of content items (different from the first content item) that are related to the current portion of the first content item based on the prediction. At step 710, the system downloads the related segments at the time.

Returning back to step 704, if the system determines that the user is navigating away from the current portion of the first content item, then the system proceeds to step 712 to determine a probability of the user navigating to at least one of the related segments in their corresponding content items (different from the content item). At step 714, the system determines whether the probability of the user navigating to at least one of the related segments is greater than a probability threshold of navigating to the related segment. The probability threshold of navigating away could be user-determined, predetermined by the system for all content, or predetermined by the system based upon the type of content. If the determined probability is greater than the probability threshold, then the system returns to step 706. However, if the determined probability is less than the probability threshold, then at step 716, the system determines a confidence score that that the user will navigate away from the current portion of the first content item for multiple duration of times. In some embodiments, the system displays the current portion in the first content item for a duration of time to determine the confidence score. In one embodiment, the system monitors displays the current portion in the first content item until the confidence score is high enough to assure that the user will navigate away from the current portion in the first content item. For example, the system determines a high confidence score of a segment in the first content item having a longer duration time than another segment in the first content item having a shorter duration time as described in greater detail below with respect to FIG. 8A.

Figure 8A:
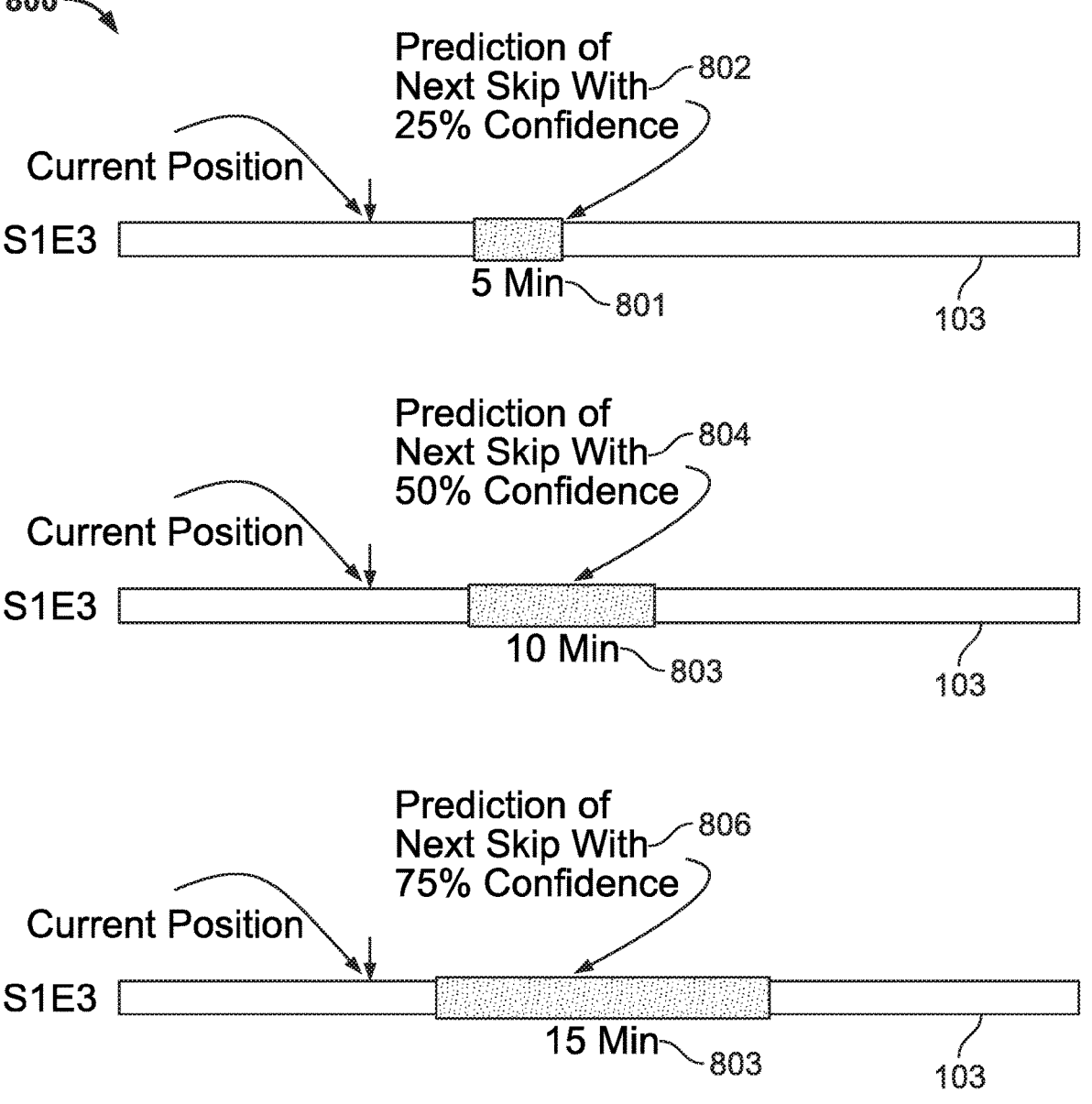
FIG. 8A depicts an illustrative example of timelines with durations of currently watched portion of a content item and their respective probability/confidence scores in accordance with some embodiments of the disclosure.

FIG. 8A shows an illustrative example of various durations 800 of currently watched portion/segment indicated by its respective indicator 108 of the first content item on its respective timeline 103. As shown, the system may determine several confidence scores of the user navigating away from the current portion/segment of the first content item (e.g. S1 E3 of FIG. 1) based on the different durations (e.g. a first duration 801 of 5 minutes, a second duration 803 of 10 minutes, a third duration 805 of 15 minutes) of the currently watched portion of the first content item. In one example, as the user is consuming the current portion of the first content item, the system may perform values of the confidence scores that the user will navigate away from the currently watched portion in the first content item at each of the first, second and third durations 801, 803 and 805, respectively. For example, a first confidence score 802 that user will navigate away from the currently watched portion in the first content item within 5 minutes duration 801 is 25%, a second confidence score 804 within the 10 minutes duration 803 is 50% and a third confidence score 806 within the 15 minutes duration 805 is 75%. In one embodiment, the system continues to display the currently portion in the first content item for the 15 minutes duration when the third confidence score 806 is 75%. As referred herein, the term "confidence score" should be understood to mean a representation of extent of interest of navigating away from a content being currently watched and may also be referred to as "interest level" or "extent of interest."

Returning back to FIG. 7, at step 718, the system determines a number of related segments to be downloaded for each of the multiple durations of the first content item. At step 720, the system determines bandwidth availability of a user device on which to download the related segments.

FIG. 8B illustrates an example of a chart 820 organizing durations 800 of the currently watched portion/segment of the first content item (e.g. S1 E3 of FIG. 1) with a number of the related segments 824 to be downloaded on the user device. The chart 820 also includes memory sizes 826 corresponding to each of the respective number of the related segments. In one example, as the user is consuming a portion of the first content item, the system may perform values such as shown in the chart 820. The chart 820 represents an analysis of number of the related segments to be downloaded based on the various durations (801, 803 and 805 of FIG. 8A) of the currently watched portion of the first content item. For example, for the duration 801, the number of related segments to be downloaded 824 are 2 and the corresponding memory size 826 is 20 MB; for the duration 803, the number of related segments to be downloaded 824 are 5 and the corresponding memory size 826 is 60 MB and for the duration 805, the number of related segments to be downloaded 824 are 8 and the corresponding memory size 826 is 75 MB.

Returning back to FIG. 7, at step 722, the system downloads one or more of the related segments based on the confidence score and the bandwidth availability score. In one example, the system downloads the related segments with high confidence score when the user device has sufficient bandwidth availability to accommodate the related segments having certain memory sizes. In another example, the system downloads the related segments with low or medium confidence score when the user device does not have sufficient bandwidth availability to accommodate the related segments with high confidence score due to the memory size of the related segments. In one embodiment, the system adjusts memory sizes of the related segments based on the bandwidth availability before downloading them. In one example, the system adjusts number of screencaps of the related segments in their corresponding content items. In another example, the system decreases the resolution/size of the screencaps of the related segments in their corresponding content items. In a further example, the system decreases resolution of a specific amount of duration in initial portion of the related segment in its corresponding content item. In some embodiments, the number of screencaps, the size of the screencaps and resolution of the screencaps are decreased for the related segments with weaker download connection compared to the related segments with stronger download connection. In one example, the screencaps are the screencaps 308 of the indicators 108 representing the locations of the corresponding segments in their respective content items in the timeline section 100 in FIG. 3 At step 724, upon user navigating to one of the related segments of the content item, the system displays the one related segment.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:

generating for display a first media asset;

receiving a user interface request to view media content portions related to a currently displayed content portion of the first media asset;

determining, by control circuitry, that a second media asset comprises one or more second content portions related to the currently displayed content portion of the first media asset;

generating, by the control circuitry, for concurrent display:

a first timeline of the first media asset;

a first indicator that indicates a first location of the currently displayed content portion on the first timeline of the first media asset;

a second timeline of the second media asset; and one or more second portion indicators, wherein each second portion indicator indicates on the second timeline a respective location of a respective second content portion of the one or more second content portions of the second media asset, wherein the concurrent display excludes display of indicators of content portions of the second media asset that are unrelated to the currently displayed content portion of the first media asset.

2. The method of claim 1, wherein each second portion indicator of the one or more second portion indicators comprises a respective screencap based at least in part on the respective second content portion of the one or more second content portions indicated by the respective second portion indicator.

3. The method of claim 2, further comprising:

based at least in part on receiving a selection of one second content portion of the one or more second content portions, displaying the selected one second content portion of the one or more second content portions.

4. The method of claim 3, wherein each second portion indicator of the one or more second portion indicators comprises the respective screencap based at least in part on the respective second content portion of the one or more second content portions indicated by the respective second portion indicator, and wherein the selection of the one second content portion is made based at least in part on a user interface interaction with the respective screencap indicating the respective second content portion.

5. The method of claim 1, further comprising:

generating for the concurrent display, by the control circuitry, a third indicator that indicates on the first timeline a location of another content portion of the first media asset, wherein the other content portion of the first media asset is related to the currently displayed content portion of the first media asset.

6. The method of claim 1, wherein the method further comprises:

based at least in part on determining that a second content portion of the first media asset is currently being displayed:

determining, by the control circuitry, one or more third content portions related to the currently displayed second content portion of the first media asset;

generating, by the control circuitry, for concurrent display:

the first timeline of the first media asset;

a new indicator that indicates a second location of the displayed second content portion on the first timeline of the first media asset;

the second timeline of the second media asset; and one or more third portion indicators that indicate, on the second timeline of the second media asset, locations of respective third content portions of the one or more third content portions of the second media asset, wherein the concurrent display excludes display of indicators of content portions of the second media asset that are unrelated to the currently displayed second content portion of the first media asset.

7. The method of claim 1, wherein the method further comprises:

predicting a duration of the first media asset being played at a specific speed;

determining a time to download the one or more second content portions, based at least in part on the predicted duration; and downloading for display, based at least in part on the time to download, each of the one or more second content portions.

8. The method of claim 1, wherein the control circuitry is configured to:

determine a probability of receiving a second user interface request to navigate to a target content portion of the one or more of the second content portions;

compare the probability with a probability threshold;

based at least in part on determining that the probability of the receiving the second user interface request is less than the probability threshold, determine a confidence score for multiple durations in the first timeline that a third user interface request will be received to navigate away from the currently displayed content portion of the first media asset;

determine a number of content portions of the one or more second content portions corresponding to each of the multiple durations in the first timeline of the currently displayed content portion of the first media asset; and based at least in part on the confidence score, download the determined number of content portions of the one or more second content portions.

9. A system comprising:
control circuitry configured to:
    generate for display a first media asset;
    receive a user interface request to view media content portions related to a currently displayed content portion of the first media asset; and
    determine that a second media asset comprises one or more second content portions related to the currently displayed content portion of the first media asset; and
a memory, wherein a respective location in the second media asset of each second content portion of the one or more second content portions is stored in the memory; and
the control circuitry is configured to:
    generate for concurrent display:
        a first timeline of the first media asset;
        a first indicator that indicates a first location of the currently displayed content portion on the first timeline of the first media asset;
        a second timeline of the second media asset; and
        one or more second portion indicators, wherein each second portion indicator indicates on the second timeline the respective location of a respective second content portion of the one or more second content portions of the second media asset, wherein the concurrent display excludes display of indicators of content portions of the second media asset that are unrelated to the currently displayed content portion of the first media asset.

10. The system of claim 9, wherein each second portion indicator of the one or more second portion indicators comprises a respective screencap based at least in part on the respective second portion of the one or more second content portions indicated by the respective second portion indicator.

11. The system of claim 10, wherein the system is configured to:
    based at least in part on receiving a selection of one second content portion of the one or more second content portions, display the selected one second content portion of the one or more second content portions.

12. The system of claim 11, wherein each second portion indicator of the one or more second portion indicators comprises the respective screencap based at least in part on the respective second portion of the one or more second content portions indicated by the respective second portion indicator, and
    wherein a selection of the one second content portion is made based at least in part on a user interface interaction with the respective screencap indicating the respective second portion.

13. The system of claim 9, wherein the system is configured to:
    generate, by the control circuitry, for the concurrent display a third indicator that indicates on the first timeline a second location of another content portion of the first media asset, wherein the other content portion of the first media asset is related to the currently displayed content portion of the first media asset.

14. The system of claim 9, wherein the system is configured to:
    based at least in part on determining that a second content portion of the first media asset is currently being displayed:
        determine, by the control circuitry, one or more third content portions related to the currently displayed second content portion of the first media asset;
        generate, by the control circuitry, for concurrent display:
            the first timeline of the first media asset;
            a new indicator that indicates a second location of the displayed second content portion on the first timeline of the first media asset;
            the second timeline of the second media asset; and
            one or more third portion indicators that indicate, on the second timeline of the second media asset, locations of respective third content portions of the one or more third content portions of the second media asset, wherein the concurrent display excludes display of indicators of content portions of the second media asset that are unrelated to the currently displayed second content portion of the first media asset.

15. The system of claim 9, wherein the system is configured to:
    predict a duration of the first media asset being played at a specific speed;
    determine a time to download the one or more second content portions related to the currently displayed content portion, based at least in part on the predicted duration; and
    download for display, based at least in part on the time to download, each of the one or more second content portions related to the currently displayed content portion.

16. The system of claim 9, wherein the system is configured to:
    determine a probability of receiving a second user interface request to navigate to a target second content portion of the one or more second content portions;
    compare the probability with a probability threshold;
    based at least in part on determining that the probability is less than the probability threshold, determine a confidence score for multiple durations in the first timeline that a third user interface request will be received to navigate away from the currently displayed content portion of the first media asset;
    determine a number of content portions of the one or more second content portions related to the currently displayed content portion corresponding to each of the multiple durations in the first timeline of the first media asset item;
    and
    based at least in part on the confidence score, download the determined number of content portions of the one or more second content portions.

\* \* \* \* \*